O. AND A. OLSON.
DISINFECTANT DUST SPRAYING MACHINE.
APPLICATION FILED JULY 9, 1918.
1,368,649.
Patented Feb. 15, 1921.
3 SHEETS—SHEET 3.
Fig. 5.
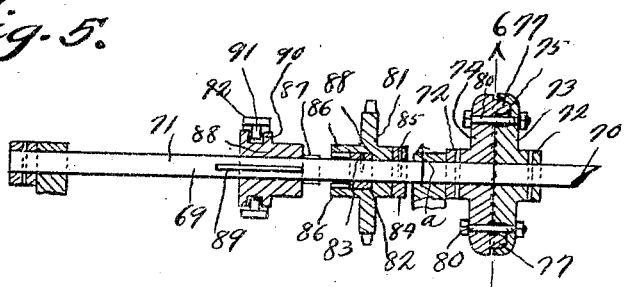
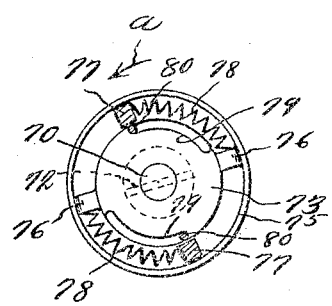
Fig. 6.
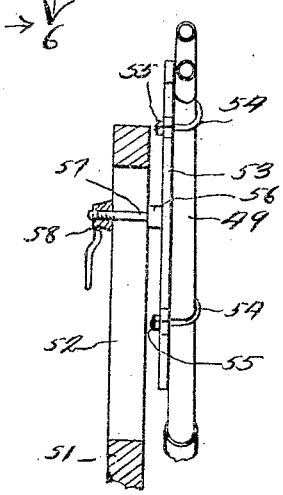
Fig. 7.
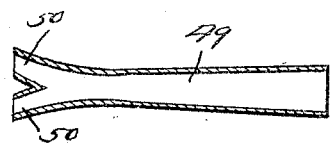
Fig. 8.
Witnesses
Philip Ferrell
Francis L. Powell
Inventors
O. Olson and A. Olson
By D. Swift & Co
Their Attorneys

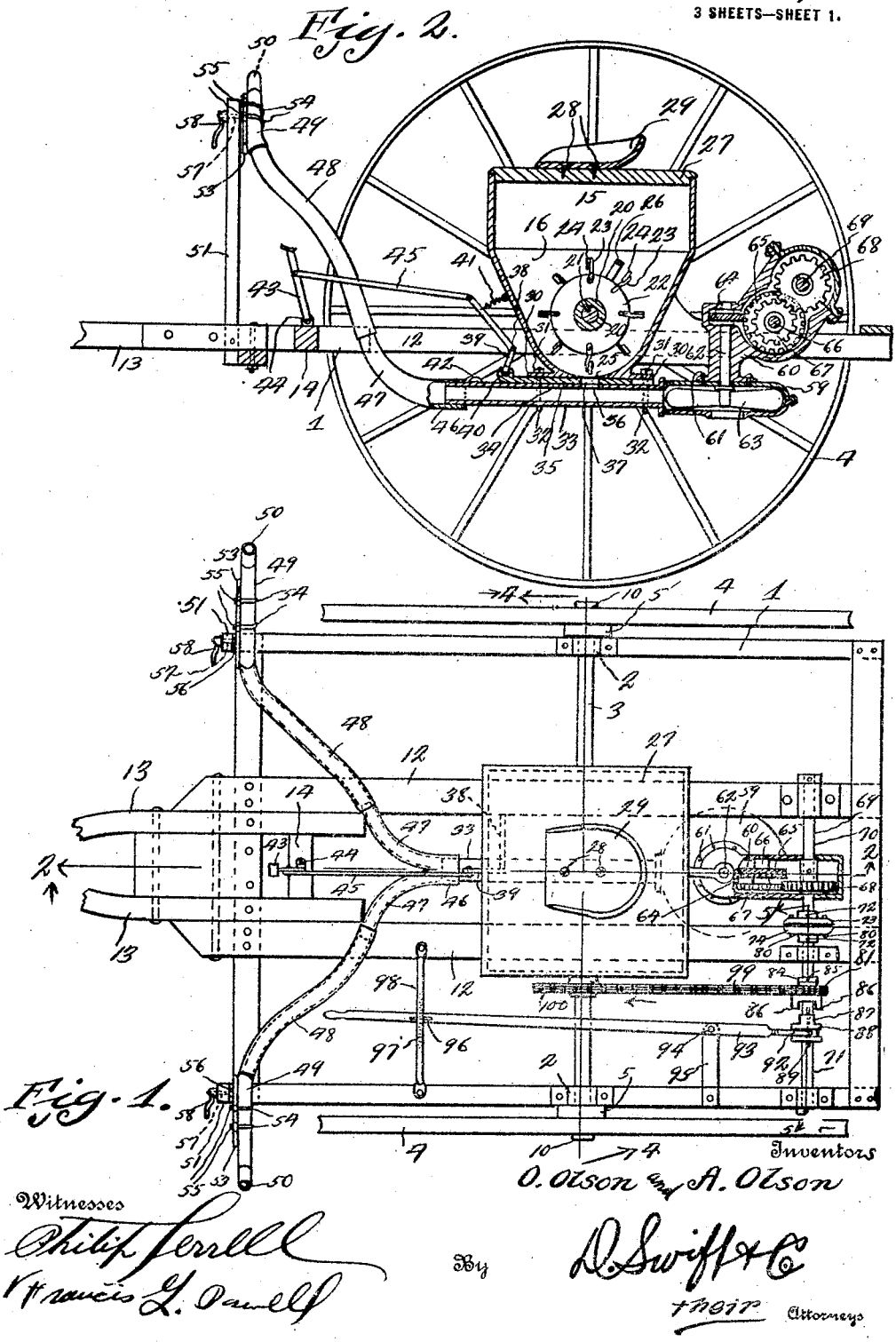

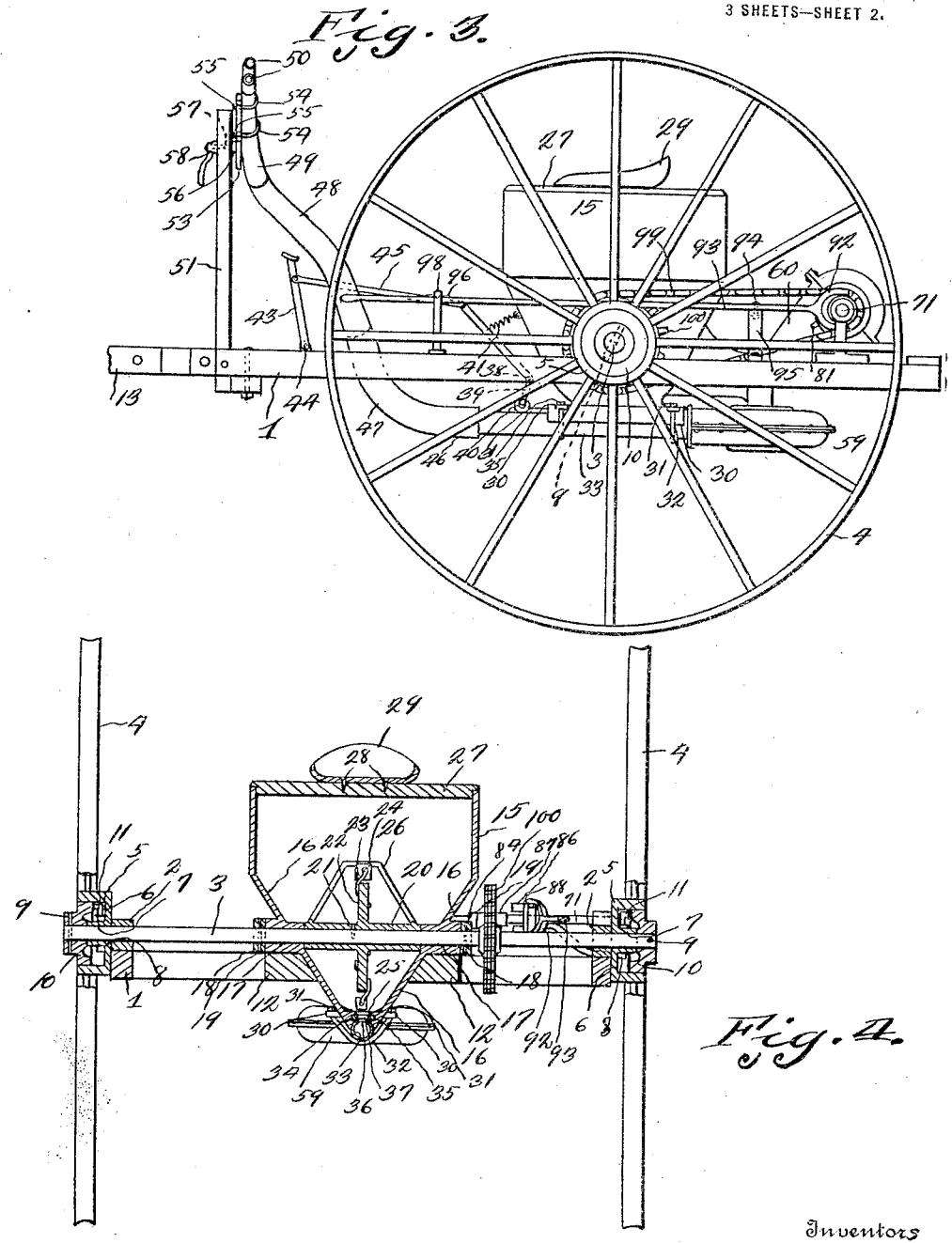

UNITED STATES PATENT OFFICE.

OLOF OLSON AND ANDREW OLSON, OF KINGSBURG, CALIFORNIA.

DISINFECTANT-DUST-SPRAYING MACHINE.

1,368,649.  Specification of Letters Patent.  Patented Feb. 15, 1921.

Application filed July 9, 1918. Serial No. 244,069.

*To all whom it may concern:*

Be it known that we, OLOF OLSON and ANDREW OLSON, citizens of the United States, residing at Kingsburg, in the county of Fresno, State of California, have invented a new and useful Disinfectant-Dust-Spraying Machine; and we do hereby declare the following to be a full, clear, and exact description of the invention, such as will enable others skilled in the art to which it appertains to make and use the same.

This invention relates to an improved machine or apparatus for spraying disinfectant material in a dust form, preferably sulfur or the like, on plants, vines, trees and the like.

The invention aims to provide an improved machine of this kind having a container or hopper, and an agitator therein provided with means acting as brushes for grinding the sulfur and sweeping the sulfur through an outlet opening into a blast or wind pipe, there being means for opening and closing the outlet opening and restricting the same in order to control the sulfur or other disinfectant material in its passage through the opening.

A further object of the invention is to provide means on the agitator, rotating therewith, in order to cut the sulfur or disinfectant material and cause it to cave down toward the outlet opening.

The invention further aims to provide a blower for the wind or blast passage, and means for gearing the blower to the drive shaft of the apparatus, which drive shaft carries the agitating means.

The invention further aims to provide means for throwing the blower in and out of gear with the drive shaft.

The invention further aims to provide a two-part shaft for the blower, and a yieldable connection between the two parts of the shaft, to relieve the strain on the gears of the blower, when stopping the apparatus.

The invention further aims to provide a wind or blast pipe terminating in branches provided with spray nozzles, for spraying the disinfectant material or sulfur to either side of the machine, either on plants, bushes, vines, trees or the like, there being supporting means for the nozzles.

A further object of the invention involves the idea of only using one of the branches, to be manually supported, so as to direct the sulfur or disinfectant on the tops of tall trees.

In practical fields the details of construction may necessitate alterations falling within the scope of what is claimed.

The invention comprises further features and combination of parts as hereinafter set forth shown in the drawings and claimed.

In the drawings:—

Figure 1 is a plan view of the improved disinfectant spraying apparatus.

Fig. 2 is a vertical sectional view on line 2—2 of Fig. 1.

Fig. 3 is a view in side elevation of the apparatus.

Fig. 4 is a sectional view on line 4—4 of Fig. 1.

Fig. 5 is a sectional view on line 5—5 of Fig. 1.

Fig. 6 is a sectional view on line 6—6 of Fig. 5.

Fig. 7 is an enlarged detail sectional view of the means for adjustably supporting the nozzles of the spray branches of the wind or blast pipe.

Fig. 8 is a detail view in section of one of the nozzles, showing the two outlets, whereby one outlet may direct the disinfectant material toward the bottom of the plant and the other to direct the material toward the top of the plant.

Referring more especially to the drawings 1 designates a suitable frame, which is preferably rectangular, and in bearings 2 of said frame an axle or shaft 3 is mounted. Supporting wheels 4 have their hubs journaled on the axle or shaft. Each hub 5 of each wheel is provided with a chamber 6, and on the outer circumference of the extension sleeve 7 of each chamber ratchet teeth 8 are provided. The hubs 5 are loosely mounted upon the shaft or axle. Secured by a pin 9 on each end of the axle is a hub section 10, which fits into the hub 5, and a portion of the hub section 10 contacts with the outer end of the sleeve extension 7. By means of the sides of the frame the supporting wheels are prevented from moving inwardly during their rotations. The hub sections 10 carry spring tensioned pivoted pawls 11, adapted to be engaged by the ratchet teeth 8 when the supporting wheels 4 are revolving forwardly, so as to impart movement to the axle or shaft. However, when the machine or apparatus is moved backwardly the pawls will ride over the teeth of the ratchets consequently to prevent movement of the axle or shaft rearwardly. This construction of ratchet mechanism for the wheels is a conventional construction, so as to only allow movement of the axle when the machine is moving forwardly. Mounted upon the frame 1 and secured thereto as a part thereof are forwardly and rearwardly extending parallel beams 12, and secured between the forward ends of these parallel beams are two members 13, for the support of a tongue or pole (not shown). A transverse piece 14 connects between the rear parts of the members 13. Arranged between the two beams 12 and supported thereon is a hopper or container 15 for the reception of any suitable disinfectant material, preferably sulfur. This hopper has the lower parts of its sides inclined, V-shaped or converged downwardly, as shown at 16, and through bearings 17 of the sides the axle or shaft 3 rotatably passes, there being collars 18 secured by pins 19 on the axle, to prevent axial movement of the axle or hopper. A sleeve 20 is keyed by means of a pin 21 to the central part of the axle within the hopper, and carried by the sleeve and integral therewith is a disk 22. Projecting from the disk radially, and at regular intervals thereon are flexible agitating arms 23, which are provided with leather tips or the like 24, which are designed to act as brushes to grind and sweep the sulfur or other disinfectant through an outlet opening 25 of the bottom of the hopper. Also carried by the sleeve 20 is a V-shaped loop or auxiliary agitating member 26, which conforms to the converging sides 16 of the hopper, and acts to cut the sulfur or other disinfectant from the sides of the hopper, and cause the same to cave in or down toward the outlet opening 25, whereby the tips may readily sweep the material toward the opening. The hopper is provided with a detachable cover or top 27, which partially fits into the hopper, and secured on the top or cover by the screws or the like 28 is an operator's seat 29. The lower part of the hopper is provided with forward and rearward extensions 30, for the reception of the arms (which are provided with nuts 31 to hold the arms secured to the extensions) of the staples or securing members 32. These staples or securing members arch upwardly on a blast or wind pipe 33, so as to hold the pipe spaced from the bottom of the hopper in order to provide a guide 34 for the reception of a slide 35. The wind or blast pipe has an elongated opening 36, which permanently registers with the opening 25. The slide 35 has an opening 37, which, when the slide is in the position shown in Fig. 2 registers with the openings 25 and 36, whereby the disinfectant material may pass therethrough and into the blast or wind pipe 33. An arm 38 extends from one of the beams 12 and pivoted on the arm 38 is an angular lever 39, the short arm of which has a loose connection or joint 40 with the slide 35. A spring 41 connects between the long arm of the lever 39 and the hopper, acting to hold the slide normally in contact with the lug 42, so as to hold the opening 37 out of registration with the openings 25 and 36. A foot lever 43 is pivotally mounted at 44 on the transverse piece 14 and connecting between the foot lever and the long arm of the lever 39 is a rod 45. It is to be noted that by applying pressure on the foot lever, the lever 39 will be oscillated to move the slide rearwardly, so as to cause the opening 37 to fully or partially register with the openings 25 and 36, in order to govern the disinfectant material or sulfur in its passage toward and into the wind pipe. The forward end of the wind pipe has connected thereto a tubular couple 46 provided with tubular branches 47, and connected to the branches are flexible tubes 48, which terminate in nozzles 49. These nozzles are provided with double or branch outlets 50, and as shown in Figs. 1, 2 and 3 the nozzles are disposed, so that the branch outlets will divide the disinfectant and direct a part thereof toward the bottoms of the plants, vines or the like and the other part toward the tops of the plants or vines. Rising upwardly from the forward corners of the frame are uprights 51 having slots 52. Plates 53 are clamped by means of the staples 54 and nuts 55 to the nozzles 49. Carried by the plates 53 are integral bosses 56 having thread extensions 57 which pass through the slots 52. Threaded on the extensions 57 are manually handled lever nuts 58 so that the plates 53 may be held in different adjusted positions vertically on the standards. Further, the plate may be adjusted at different angles so as to spray the material in different directions. The apparatus is designed to be driven between the rows of plants, bushes or trees, and since the nozzles are disposed laterally, the sulfur or other disinfectant is sprayed upon the plants. A blower casing 59 is coupled in any suitable manner to the rear end of the wind or blast pipe. A gear casing 60 is mounted upon the blower casing 59 and secured thereto in any suitable manner as shown at 61. A vertical shaft 62 is mounted in the casing 60, and its lower end extends into blower casing 59, and carries a blow fan 63, adapted to force air rapidly through the pipe 33, in order to blow the disinfectant material in the branch tubes and out through the nozzles. The upper end of the shaft 62 has a worm gear 64, which meshes with the screw gear 65, which is mounted upon the stub shaft 66 to rotate therewith. Also carried by the stub shaft 66 is a gear 67, which meshes with the gear 68 carried by the shaft 69. This shaft 69 consists of two axially alined sections 70 and 71, the adjacent ends of which have secured thereto by means of the pin 72 the concentrically arranged disks 73 and 74. The face of the disk 73 is provided with an annular channel 75, at diametrically opposed part of which lugs 76 are formed integrally therein, the disk 74 at diametrically opposed points having projecting lugs 77, which, under normal conditions, are at right angles to the lugs 76. Interposed between the lugs 76 and 77 are expansion springs 78. The disk 73 is provided with arcuate slots 79 which are opposed to each other, there being transversely arranged bolts 80 passing through the disk 74 at diametrically opposite points adjacent the lugs 77, and through the slots 79. By this construction it will be noted that when the section 71 of the shaft 69 rotates in the direction of the arrow *a* in Figs. 1 and 5 and in Fig. 6, the pins will contact with the ends of the slots and carry the section 70 of the shaft 69 and hence impart movement to the blower fan. However, when the apparatus stops and the shaft 69 stops rotating, this yieldable couple between the two sections 70 and 71 of the shaft 69 relieves strain on the gear connections with the blow fan. Mounted upon the section 71 of the shaft 69 loosely is a sprocket 81, the hub of which is chambered out for the reception of the collar 82 which is secured by a pin 83 to the section 71. A second collar 84 is secured by a pin 85 to the section 71 of the shaft 69, thereby preventing axial movement of the sprocket on the shaft. The sprocket has its hub equipped with diametrically opposed clutch teeth 86, between which the clutch teeth 87 of the clutch member 88 engage. This clutch member 88 is feathered or splined to the section 71 of the shaft 69 as indicated at 89. The clutch member 88 has an annular groove 90, to be engaged by the diametrically opposed lugs 91 of the forks 92 of the lever 93 which is pivoted at 94 to an arm 95 of the frame 1. This lever 93 has a projecting rib 96, to engage the teeth 97 of the rack bar 98, which is carried by the frame. A sprocket chain 99 engages about the sprocket 81 and also about the sprocket 100, which is fast on the shaft or axle 3, and since the axle 3 is movable with the supporting wheels, power is transmitted to the shaft 69, that is when the clutch member 88 is in gear with the loosely mounted sprocket 81. By manipulation of the lever 93 the clutch member 88 may be actuated.

As the machine moves forwardly the axle 3 will rotate, thereby causing the clutch member 86 to also rotate through the medium of the sprocket chain 99. When it is desired to operate the blower fan 63 for forcing disinfectant dust through the longitudinally disposed pipe 33, the clutch member 88 is moved into engagement with the clutch member 86. When the clutch members are in engagement the shafts 71 and 70 will be rotated and the blower fan 63 will also be rotated through the gear train thereby operating the fan 63 for forcing air through the longitudinally disposed pipe 33 and forcing the disinfectant dust through the discharge pipe 47 as it is deposited into the pipe 33 from the hopper 15 through the registering apertures in the upper side of the pipe 33 and the hopper discharge aperture 25, between which apertures an aperture slide is disposed. The axle 3 during this movement rotates and operates an agitator within the hopper for preventing the dust or insecticide from becoming caked within the hopper.

The invention having been set forth what is claimed as new and useful is:—

1. A wheel supported and operated spraying device comprising a frame, a hopper having a shaft mounted in bearings of the frame and extending through said hopper, wheels on the ends of said shaft for supporting the frame and rotating the shaft, an agitator carried by said shaft and disposed in the hopper, a pipe longitudinally disposed and secured to the under side of the hopper, one end of said pipe extending forwardly and merging into branch pipes extending outwardly, the rear end of said longitudinally disposed pipe having connected thereto a casing, a fan horizontally disposed in said casing provided with an upwardly extending shaft, a countershaft carried by the frame and operated from the axle, and a gear train connecting the counter shaft and the upwardly extending shaft of the fan.

2. A wheel supported and operated spraying device comprising a frame, a hopper having a shaft mounted in bearings of the frame and extending through the hopper, wheels on said shaft for supporting the frame and rotating the shaft, an agitator carried by said shaft and disposed in the hopper, a longitudinally disposed pipe secured to the under side of the hopper and having a passage of communication therewith, a valve interposed between the pipe and hopper and disposed in a passage of communication therebetween, means for controlling said valve from the forward end of the frame, one end of said pipe extending forwardly and merging into branch pipes outwardly disposed, the rear end of said longitudinally disposed pipe having connected thereto a casing, a fan horizontally disposed in said casing and provided with an upwardly extending shaft, a countershaft transversely disposed and rotatably mounted in bearings to the rear of the hopper, a gear train connecting the countershaft and the upwardly extending fan shaft, means for operating the countershaft from the axle, means for stopping and starting the rotation of the countershaft and means for preventing sudden stopping and starting of the fan, said means being carried by the countershaft.

In testimony whereof we have signed our names to this specification in the presence of two subscribing witnesses.

OLOF OLSON.
ANDREW OLSON

Witnesses:
W. C. NELSON,
C. F. DRAPER.